(12) United States Patent
Tracy

(10) Patent No.: US 6,362,959 B2
(45) Date of Patent: *Mar. 26, 2002

(54) DOCKING STATION WITH THERMOELECTRIC HEAT DISSIPATION SYSTEM FOR DOCKED PORTABLE COMPUTER

(75) Inventor: Mark S. Tracy, Tomball, TX (US)

(73) Assignee: Compaq Computer Corporation, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/785,148

(22) Filed: Feb. 16, 2001

Related U.S. Application Data

(63) Continuation of application No. 09/191,455, filed on Nov. 12, 1998, now Pat. No. 6,191,943.

(51) Int. Cl.⁷ .................................................. G06F 1/16

(52) U.S. Cl. ........................ 361/687; 361/679; 361/683; 361/686; 361/687; 361/688; 361/689; 361/690; 361/691; 361/692; 361/694; 361/695; 361/696; 361/697; 361/701; 361/702; 361/703; 361/704

(58) Field of Search ................................. 361/679, 683, 361/686–692, 694–697, 701, 702–704

(56) References Cited

U.S. PATENT DOCUMENTS

| | | | |
|---|---|---|---|
| 5,704,212 A | 1/1998 | Erler et al. | 62/3.2 |
| 6,038,128 A | 3/2000 | Hood, III et al. | 361/687 |
| 6,040,981 A | 3/2000 | Schmitt et al. | 361/695 |
| 6,084,769 A | 7/2000 | Moore et al. | 361/687 |
| 6,191,943 B1 * | 2/2001 | Tracy | 361/687 |

* cited by examiner

*Primary Examiner*—Leo P. Picard
*Assistant Examiner*—Yean-Hsi Chang

(57) ABSTRACT

A portable computer docking base has incorporated therein a thermoelectric cooling system used to provide auxiliary operating heat dissipation for a portable notebook computer operatively docked to the base. The cooling system includes a thermoelectric (Peltier effect) heat pump unit disposed within the docking base housing and having opposite hot and cold sides. A finned heat sink member is secured to the hot side of the assembly and positioned in the path of fan-generated cooling air, and a heat slug member is secured to the cold side of the assembly and projects outwardly through an exterior wall of the docking base housing into its computer receiving area. When the computer is placed in the receiving area and docked, the cooling system heat slug member is brought into heat conductive contact with a similar heat slug member carried within the computer and thermally coupled to its microprocessor. Operating heat from the microprocessor is transferred through the contacting heat slugs, passes through the thermoelectric heat pump assembly to its hot side heat sink, and is dissipated from the heat sink to the cooling air flow within the docking base.

31 Claims, 2 Drawing Sheets

DOCKING STATION WITH THERMOELECTRIC HEAT DISSIPATION SYSTEM FOR DOCKED PORTABLE COMPUTER

This application is a continuation of application Ser. No. 09/191,455 filed Nov. 12, 1998, now U.S. Pat No. 6,191,943.

BACKGROUND OF THE INVENTION

1. Field of the Invention

The present invention generally relates to computer apparatus and, in a preferred embodiment thereof, more particularly relates to apparatus for dissipating operating heat from a portable computer operatively connected to a docking station used to electrically connect the docked computer to desktop peripheral devices.

2. Description of Related Art

With the advancement of computer microprocessor technology, portable computers such as the increasingly popular notebook computer are beginning to equal larger desktop computers in performance. The more advanced notebook computers also produce, in quite a small spatial envelope, a very significant amount of operating heat which approaches that generated in a desktop computer and provides the computer designer with the challenging task of sufficiently dissipating the operating heat in order to avoid undesirably high temperatures within the interior of the notebook computer and on its various external surface areas.

Many modern notebook computers are typically operated in three modes—(1) by itself under internal battery power, (2) by itself using converted DC electrical power from an AC electrical source, or (3) operatively connected (or "docked") to a docking station expansion base structure which electrically couples the docked portable computer to desktop peripheral devices such as a monitor, mouse and keyboard.

In the first two of these operating modes the display screen lid portion of the notebook computer is opened, thereby increasing the total exterior surface area of the computer exposed to ambient air to which computer operating heat may be dissipated. When the notebook computer is coupled to the docking station, however, the computer's display screen lid is closed, thereby reducing the overall exposed exterior computer surface area from which heat may be dissipated. This tends to appreciably increase the interior and exterior operating temperatures of the docked computer compared to applications in which it operated by itself with its display screen lid in its opened orientation. Such operating temperature increases are aggravated by the fact that the docking station physically covers and insulates large exterior portions of the docked computer and inhibits the dissipation of heat therefrom.

As an example, a modern high speed notebook computer microprocessor can generate within the computer on the order of about 8 watts when the computer is in its battery mode, about 10–12 watts when the computer is in its AC mode, and up to about 20 watts when the computer is operatively coupled to a docking station.

Of course, from an operating heat dissipation standpoint, provisions must be made to handle the maximum heat load condition—i.e., when the notebook computer is docked with its lid closed. This has proven to be an extremely challenging design task since the small spatial envelope of modern notebook computer as a practical matter precludes the use therein of traditional desktop computer cooling apparatus such as large internal fans and heat sinks.

A need thus exists for apparatus which will adequately dissipate the substantially increased operating heat generated by a docked portable notebook computer. It is to this need that the present invention is directed.

SUMMARY OF THE INVENTION

In carrying out principles of the present invention, in accordance with a preferred embodiment thereof, a specially designed docking base is utilized to provide auxiliary operating heat dissipation for a portable computer, representatively a notebook computer, operatively docked thereto. This auxiliary heat dissipation provided by the docking base advantageously reduces the amount of computer operating heat dissipation that must be provided for by apparatus carried within the portable computer itself.

In a preferred embodiment thereof, the docking base has a housing with which a thermoelectric cooling system is operatively associated. The docking base housing has a receiving area through which a portable computer may be moved through a docking path into an operatively docked position relative to the docking base housing.

The thermoelectric cooling system is operative to dissipate operating heat from the docked portable computer and has a cold side portion positioned to be engaged and receive heat from a heat dissipation portion of the portable computer, which is thermally communicated with an internal heat-generating component within the computer, in response to movement of the portable computer through the docking path.

Preferably, the cold side portion of the thermoelectric cooling system projects into the docking path and, in conjunction with a portable computer configuration useable with the docking base, is receivable in an external computer housing side surface recess when the computer is docked. The computer's heat dissipating portion, representatively a finned heat sink member thermally connected to the computer's microprocessor, is exposed within the recess and is engageable by the cold side portion as the computer is docked.

In accordance with one aspect of the invention, the thermoelectric cooling system includes a thermoelectric heat pump unit having a cold side from which a metal heat slug member projects upwardly through a docking base housing wall into the docking path, the metal heat slug member defining the aforementioned cold side portion of the thermoelectric cooling system. The docking path extends rearwardly through the docking base receiving area, and the exposed top side surface of the heat slug member is rearwardly and upwardly sloped. The computer housing recess is formed in a bottom side thereof, with the bottom side surface of the computer's heat dissipating member being covered with a suitable thermal interface material and sloped in a manner such that it is in parallel abutment with the top side surface of the cooling system heat slug member when the computer reaches its docked orientation. A protective spring-loaded cover door is slidably secured over an outer side portion of the computer housing recess and is pushed into the housing by docking base wall projections adjacent the cooling system heat slug member entering the computer recess, and spring-returned to its original position when the slug member is withdrawn from the computer recess.

The hot side of the thermoelectric heat pump unit within the docking base housing illustratively has a heat sink member secured thereto, and a cooling fan is provided for use in dissipating heat from the heat sink member. The cooling fan representatively has its inlet coupled by a duct structure to an inlet opening in an exterior wall section of the docking base housing and is operative to sequentially flow ambient air inwardly through the inlet opening, across the hot side heat sink, and then outwardly through an outlet opening in an exterior wall section of the docking base housing.

DETAILED DESCRIPTION

Figure 1:
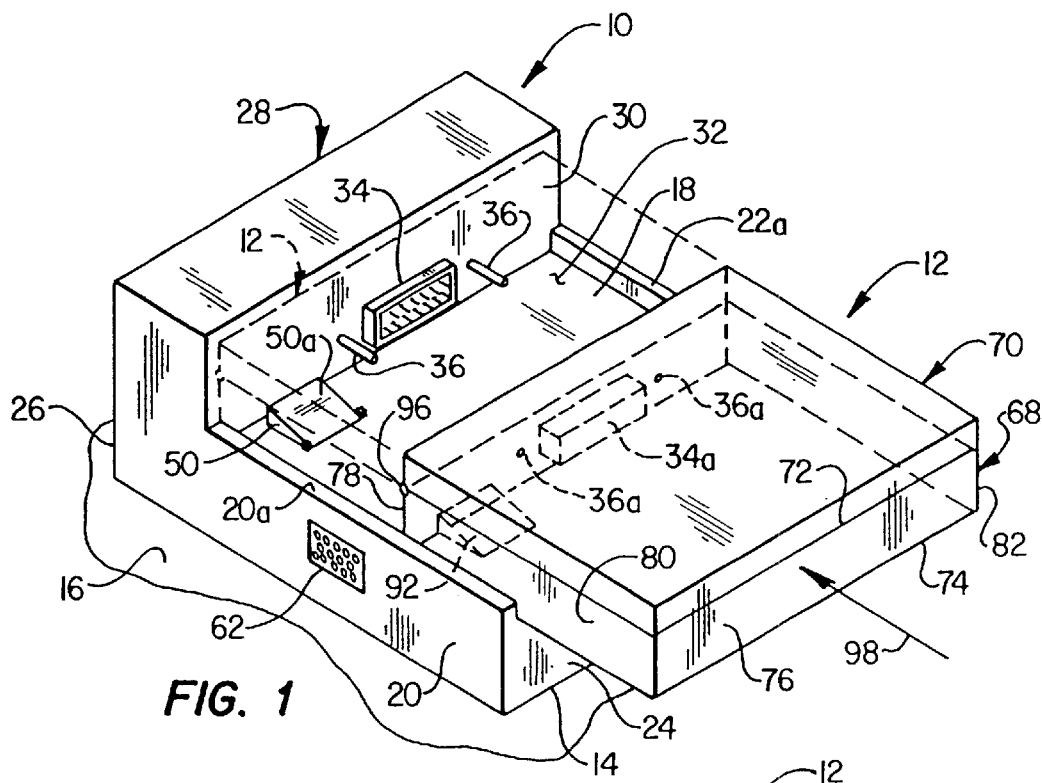
FIG. 1 is a simplified, somewhat schematic perspective view of a representative portable notebook computer being operatively coupled to a docking station expansion base.

Perspectively illustrated in simplified, somewhat schematic form in FIG. 1 is a specially designed docking station expansion base 10 that embodies principles of the present invention and is used to operatively couple a representative portable notebook computer 12 to selected desktop peripheral devices (not shown) such as a monitor, mouse and keyboard.

The expansion base 10 has a generally rectangularly configured housing with a horizontal bottom side wall 14 adapted to rest on a horizontal support surface such as a desktop 16, a horizontal top side wall 18, left and right vertical side walls 20 and 22, and front and rear end walls 24 and 26. Expansion base 10 also has an upwardly projecting rear housing end portion 28 which includes the rear end wall 26 and has a vertical front wall 30 forwardly spaced apart therefrom. Upper side edge portions 20a,22a of the housing side walls 20,22 project upwardly beyond the top side wall 18 and form therewith a recessed computer docking receiving area 32 that horizontally extends between the vertical housing walls 24 and 30.

Centrally disposed on the front wall 30 of the upwardly projecting rear housing end portion 28 is a forwardly projecting, horizontally elongated electrical connector 34 positioned between two forwardly projecting guide pins 36. Connector 34 is operatively coupled to interface circuitry 38 located within the expansion base 10 (see FIGS. 3A and 3B). Interface circuitry 38 functions in a conventional manner to operatively couple the connector 34 (and thus the computer 12 when it is docked to the expansion base 10 as later described herein) to selected desktop peripheral devices (not shown) such as a monitor, a mouse and a keyboard.

According to a key aspect of the present invention, a specially designed thermoelectric computer cooling system 40 (see FIGS. 3A and 3B) is disposed within the interior of the expansion base 10 and is used, as later described herein, to provide auxiliary operating heat dissipation for the computer 12 when it is operatively docked to the expansion base 10.

Figure 3A:
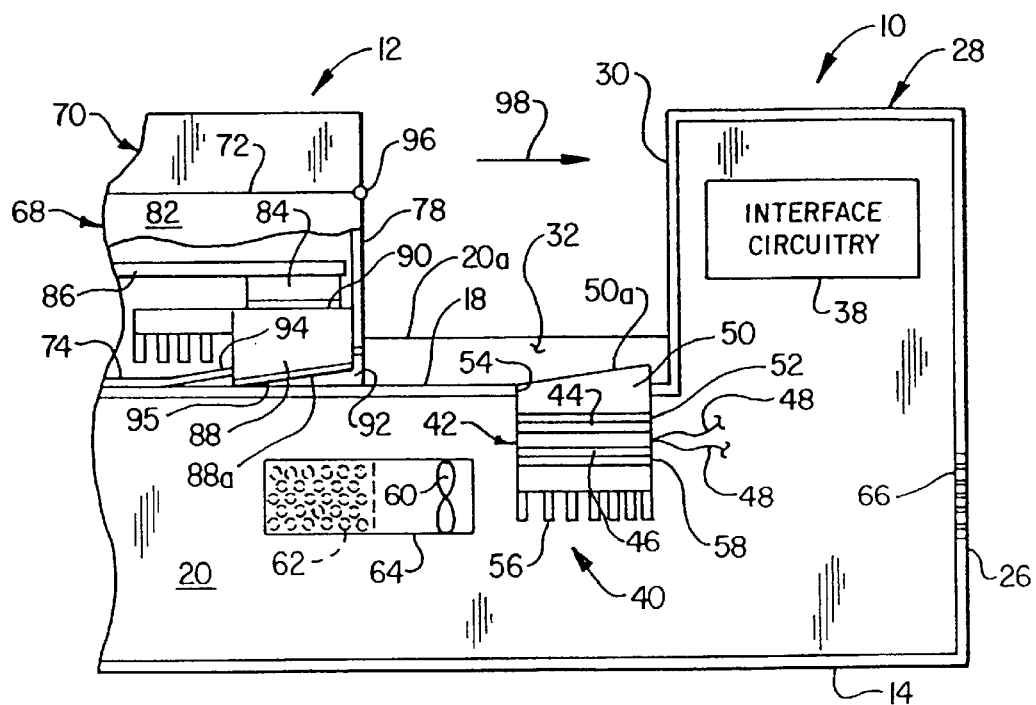
FIGS. 3A and 3B are enlarged scale schematic cross-sectional views taken along line 3—3 of FIG. 2 through the expansion base and notebook computer and respectively illustrate the portable computer in undocked and docked positions thereof in addition to schematically illustrating the operation of a specially designed thermoelectric computer heat dissipating system incorporated in the expansion base.

Turning now to FIG. 3A, the cooling system 40 includes a thermoelectric (Peltier effect) heat pump unit 42 having vertically opposite cold and hot side plates 44,46 and being supplied with DC electrical power from a suitable source thereof via a pair of electrical leads 48. Representatively, the thermoelectric heat pump unit 42 may be a commercially available unit such as those manufactured in solid state modular form by the Melcor Corporation of Trenton, N.J. under the tradename "FRIGICHIP". Basically, in response to the supply of electrical power thereto, the heat pump unit 42 acts as a thermoelectric cooler (TEC) that continuously moves heat from its upwardly facing cold side 44 to its downwardly facing hot side 46.

A metal heat slug member 50 is secured to the cold side 44, in a thermally conductive relationship therewith, by a layer of suitable thermal interface material 52 and projects upwardly through an opening 54 in the top side wall 18 of the expansion base 10 into the receiving area 32 forwardly adjacent the front wall 30 of the rear housing end portion 28. For purposes later described herein, the top side surface 50a of the heat slug member 50 slopes rearwardly and upwardly at a relatively small angle and two small upward projections 59 are formed on the top expansion base wall 18 (see FIG. 2) adjacent the front corners of the upwardly projecting portion of the heat slug member 50. A finned metal heat sink structure 56 is secured to the hot side 46 of the heat pump unit 42 by a layer of suitable thermal interface material 58.

The thermoelectric cooling system 42 also includes a cooling fan 60 disposed within the interior of the expansion base housing forwardly of the heat sink structure 56. The inlet of the cooling fan 60 is coupled to a perforated air inlet area 62 on the expansion base housing wall 22 by a suitable duct or shroud 64. To exhaust the flow of air created by the cooling fan 60, a perforated air outlet opening area 66 is formed in the rear end wall 26 of the expansion base housing.

Referring now to FIGS. 1–3B, the notebook computer 12 has generally rectangular base and display screen lid housings 68 and 70. Base housing 68 has top and bottom side walls 72 and 74, front and rear side walls 76 and 78, and left and right end walls 80 and 82. Disposed within the base housing 68 is a heat generating electronic component, representatively a microprocessor 84, which is mounted on the bottom side of a horizontally oriented circuit board 86 inwardly adjacent the rear base housing wall 78.

The bottom side of the microprocessor 84 is secured to the top side of a finned metal heat sink structure 88, in thermal communication therewith, by a suitable thermal interface material 90. As best illustrated in simplified form in FIG. 2, a rearwardly extending recess 92 is formed in a bottom edge portion of the rear base housing wall 78 and has an open bottom side and is upwardly bounded by a downwardly and forwardly sloping recessed wall portion 94 of the expansion base housing. The slope of the wall 94 is identical to that of the exposed top side 50a of the heat slug member 50. When the portable computer 12 is operatively placed in the expansion base receiving area 32 as later described herein, the recess 92 is horizontally aligned with the exposed upper end portion of the heat slug member 50 so that such upper end portion enters the recess 92 as the computer 12 reaches its docked orientation on the expansion base 10. As can best be seen in FIG. 3A, a lower portion of the heat sink structure 88 projects downwardly through a suitable opening in the top recess wall 94, into the recess 92, and has a downwardly and forwardly sloping bottom side surface 88a which has a slope angle identical to that of the exposed top side 50a of the heat slug member 50 and is covered by a suitable thermal interface material 95.

Turning now to FIG. 1, a recessed electrical connector 34a, which is releasably mateable with the expansion base connector 34, is centrally located on the rear side wall 78 of the base housing 68 between two circular holes 36a formed in the wall 78 and configured to releasably receive the guide pins 36 as the computer 12 is being docked as later described herein. The rectangular display screen lid housing 70 of the portable notebook computer 12 is secured by a hinge structure 96 to a top rear side edge portion of the base housing 68 for pivotal movement relative to the base housing 68 between a closed position (shown in FIGS. 1–3B) in which the lid housing 70 extends across and covers the top side 72 of the base housing 68, and an open position (not shown) in which the lid housing 70 is pivoted away from top base housing side 72 to a generally vertical stand-alone use orientation. A suitable latch mechanism (not shown) is provided for releasably holding the display screen lid housing 70.

With the notebook computer 12 in its illustrated closed orientation, the computer is docked to the expansion base 10 by placing the computer 12 in the recessed receiving area 12 with the lid housing 70 facing upwardly and the rear side wall 78 of the base housing 68 facing the front wall 30 of the expansion base rear housing end portion 28. When the computer 12 is placed in the receiving area 32 in this manner, the bottom wall 74 of the base housing 68 contacts the top side wall 18 of the expansion base 10 in a manner vertically aligning the computer connector 34a, guide pin openings 36a and base housing rear side recess 92 respectively with the expansion base electrical connector 34, guide pins 36 and the exposed, upwardly projecting portion of the heat slug member 50. Additionally, the left and right end walls 80,82 of the computer base housing 68 slidingly engage the upwardly projecting expansion base guide portions 20a,22a in a manner horizontally aligning the computer connector 34a, guide pin openings 36a and base housing rear side recess 92 respectively with the expansion base electrical connector 34, guide pins 36 and the exposed upwardly projecting portion of the heat slug member 50.

Figure 3B:
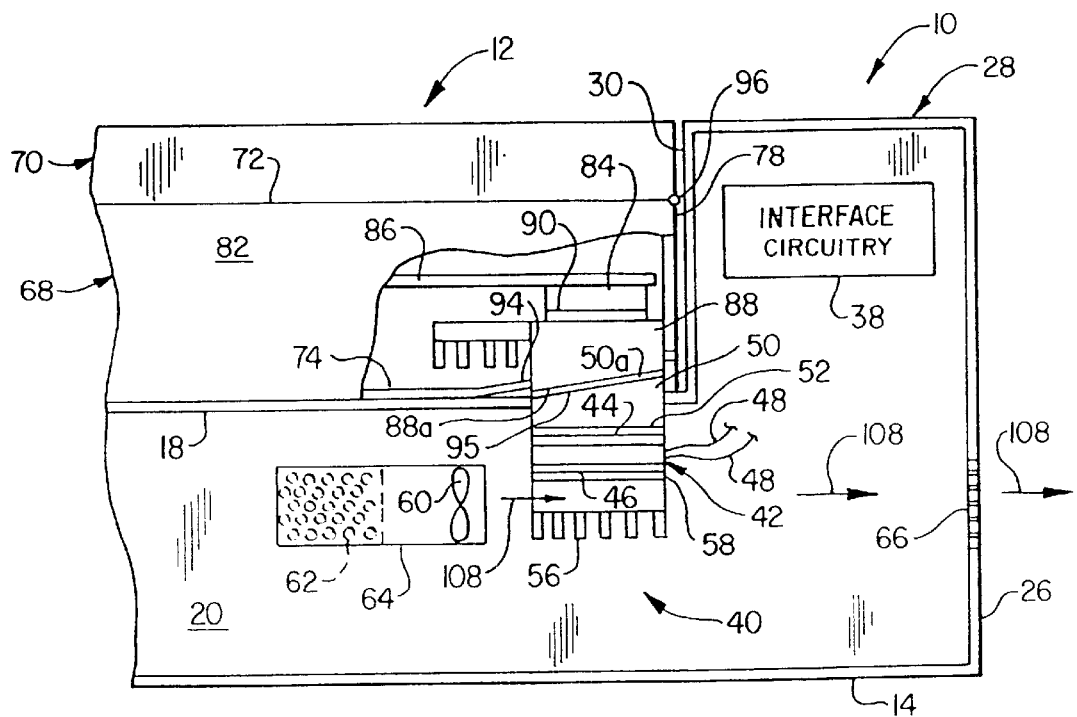

Next, as indicated by the arrow 98 in FIGS. 1 and 3A, the computer 12 is moved rearwardly toward the vertical expansion base wall 30—either manually or by a suitable motorized drive system appropriately incorporated into the expansion base 10—to the computer's docked orientation shown in FIG. 3 and in dotted lines in FIG. 1—As the rear side of the computer 12 approaches the vertical expansion base wall 30, the guide pins 36 enter the rear computer wall openings 36a, the connectors 34,34a are releasably mated to couple the internal computer electronics to the desktop peripheral devices (not shown) via the interface circuitry 38, and the exposed top side portion of the thermoelectric cooling system heat slug member 50 enters the computer base housing recess 92 to bring the sloping top side 50a of the heat slug member (which forms a portion of the overall cold side section of the thermoelectric cooling system 40) into complementary heat transfer engagement with the thermal interface material layer 95 on the identically sloped bottom side 88a of the computer heat sink structure 88 (see FIG. 3B).

Figure 2:
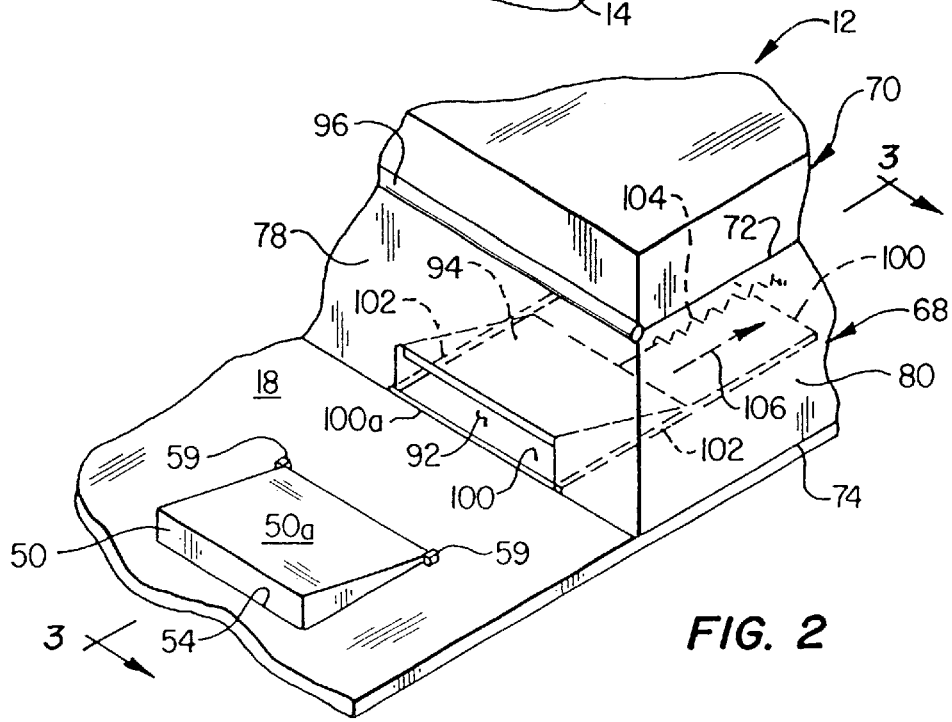
FIG. 2 is an enlarged scale perspective view of a left rear portion of the notebook computer and an adjacent portion of the top side receiving area of the expansion base.

To shield the heated computer heat sink structure 88 from a user's touch, a protective door panel 100 (shown in FIG. 2, but omitted from FIGS. 3A and 3B for illustrative clarity) is horizontally mounted on the computer base housing 68, by rail structures 102, along the bottom side of the recess 92 and is resiliently biased rearwardly, by a schematically depicted spring structure 104, to its solid line FIG. 2 position in which its rear edge 100a is aligned with the rear wall 78 of the base housing 68. As the upwardly projecting portion of the heat slug member 50 enters the recess 92, the projections 59 engage the rear edge 100a of the door panel 100 and, as indicated by the arrow 106 in FIG. 2, move the door panel 100 to its forwardly deflected dotted line position to permit the previously described thermal interface contact between the heat slug 50 and the computer's heat sink structure 88.

With the computer 12 docked as schematically illustrated in FIG. 3B, operating heat from the computer processor 84 (or other heat-generating electronic component to which the heat sink structure 88 could be connected) is transferred downwardly through the abutting heat sink 88 and heat slug 50 to the cold side 44 of the heat pump unit 42, thermo-electrically transferred to the hot side 46 and into the heat sink member 56, and then dissipated from the heat sink member 56 by operation of the fan 60 which sequentially flows ambient cooling air 108 inwardly through the air inlet opening area 62, through the duct 64, across the heat sink member 56 and outwardly through the expansion base air outlet opening area 66.

The computer operating heat dissipation provided by the specially designed expansion base thermoelectric cooling system 40 of the present invention augments the cooling system disposed within the interior of the computer 12, which may include the heat sink structure 88 and other components not illustrated herein. Importantly, the additional computer heat load created by docking the computer 12 with its display screen lid housing 70 closed and major portions of its exterior surface area blocked by portions of the expansion base 10 is dissipated without increasing the interior computer space that must be dedicated to heat dissipation apparatus. Thus, the heat dissipation system within the notebook computer 12 need only be sized to handle the substantially lesser operating heat generated by the computer 12 In Its undocked battery and AC power modes.

The representatively illustrated vertically facing arrangement of the abuttable expansion base and computer heat transfer elements 50 and 88 is particularly well suited to the typically horizontal orientation of the computer microprocessor 84. However, as will be appreciated by those of skill in this particular art, these abuttable heat transfer elements could be placed in other locations, and in other facing orientations if desired. As but one example, the cooling system heat slug member 50 could project forwardly from the vertical expansion base wall 30 and abut a forwardly facing surface of the computer heat sink structure 88. In this representative alternate arrangement, the abutting surfaces of these heat transfer elements could be vertically oriented, and would not have to be sloped.

The foregoing detailed description is to be clearly understood as being given by way of illustration and example only, the spirit and scope of the present invention being limited solely by the appended claims.

What is claimed is:

1. A portable computer docking system, comprising:
    a portable computer having a base housing, a microprocessor and a heat sink to conduct heat away from the microprocessor, wherein the heat sink comprises a sloped surface exposed via an opening in the base housing; and
    a docking base having a heat pump coupled to a heat slug and to a heat sink, wherein the heat slug comprises a corresponding sloped surface to abuttingly receive the sloped surface when the portable computer is docked in the docking base.

2. The portable computer docking system as recited in claim 1, wherein the docking base further comprises a fan positioned to direct an airflow across the heat sink.

3. The portable computer docking system as recited in claim 1, wherein the heat pump comprises a thermoelectric heat pump.

4. The portable computer docking system as recited in claim 1, wherein the docking base comprises an electrical connector positioned to receive a portable computer connector.

5. The portable computer docking system as recited in claim 1, wherein the docking base comprises a lateral guide to slidably guide the portable computer to a docked position.

6. The portable computer docking system as recited in claim 5, wherein the docking base further comprises at least one guide pin positioned proximate the electrical connector.

7. The portable computer docking system as recited in claim 1, wherein the sloped surface is disposed at a recessed position within the base housing.

8. A portable computer docking system, comprising:
   a portable computer having a recessed heat sink; and
   a docking base comprising a heat transfer system having an extended slug positioned for engagement with the recessed heat sink when the portable computer is docked with the docking base.

9. The portable computer docking system as recited in claim 8, wherein the heat transfer system comprises a heat sink coupled to the heat pump.

10. The portable computer docking system as recited in claim 9, wherein the heat pump is coupled to the extended slug.

11. The portable computer docking system as recited in claim 10, wherein the heat transfer system comprises a heat sink coupled to the heat pump.

12. The portable computer docking system as recited in claim 11, wherein the heat pump is electrically powered.

13. The portable computer docking system as recited in claim 12, further comprising a cooling fan positioned to transfer air across the heat sink.

14. The portable computer docking system as recited in claim 13, wherein the portable computer comprises a base housing having a bottom wall through which the recessed heat sink is recessed.

15. The portable computer docking system as recited in claim 14, wherein the recessed heat sink comprises a sloped surface through which heat is transferred.

16. The portable computer docking system as recited in claim 15, wherein the extended slug comprises a corresponding sloped surface positioned to abut the sloped surface.

17. The portable computer docking system as recited in claim 16, wherein the portable computer comprises a microprocessor coupled to the recessed heat sink.

18. The portable computer docking system as recited in claim 11, wherein the heat pump comprises a thermoelectric heat pump.

19. A method for cooling a portable computer, comprising:
   sliding a personal computer laterally along a guide of a docking base;
   electrically engaging the personal computer with the docking base; and
   engaging a recessed heat transfer surface of the portable computer with an extended heat transfer surface of the docking base.

20. The method as recited in claim 19, further comprising utilizing a heat pump to conduct heat away from the recessed heat transfer surface.

21. The method as recited in claim 20, further comprising locating the recessed heat transfer surface within a base housing of the portable computer.

22. The method as recited in claim 21, further comprising orienting the recessed heat transfer surface along an inclined plane.

23. The method as recited in claim 22, further comprising providing the extended heat transfer surface with an incline corresponding to the recessed heat transfer surface.

24. The method as recited in claim 23, further comprising utilizing a thermoelectric heat pump to conduct heat away from the recessed heat transfer surface.

25. The method as recited in claim 19, further comprising utilizing a thermoelectric heat pump to conduct heat away from the recessed heat transfer surface.

26. A docking station for a computer, comprising:
   a housing having a lateral guide positioned to slidably guide a computer to a docked position; and
   a heat pump within the housing, the heat pump being configured to conduct heat away from the computer when located in the docked position.

27. The docking station as recited in claim 26, wherein the heat pump comprises a thermoelectric heat pump.

28. The docking station as recited in claim 26, further comprising a heat transfer slug coupled to the heat pump and positioned to extend from the housing.

29. The docking station as recited in claim 28, further comprising a heat sink coupled to the heat pump.

30. The docking station as recited in claim 29, further comprising a fan positioned to direct an airflow across the heat sink.

31. The docking station as recited in claim 30, wherein the heat pump comprises a thermoelectric heat pump.

* * * * *